United States Patent Office 3,451,155
Patented June 24, 1969

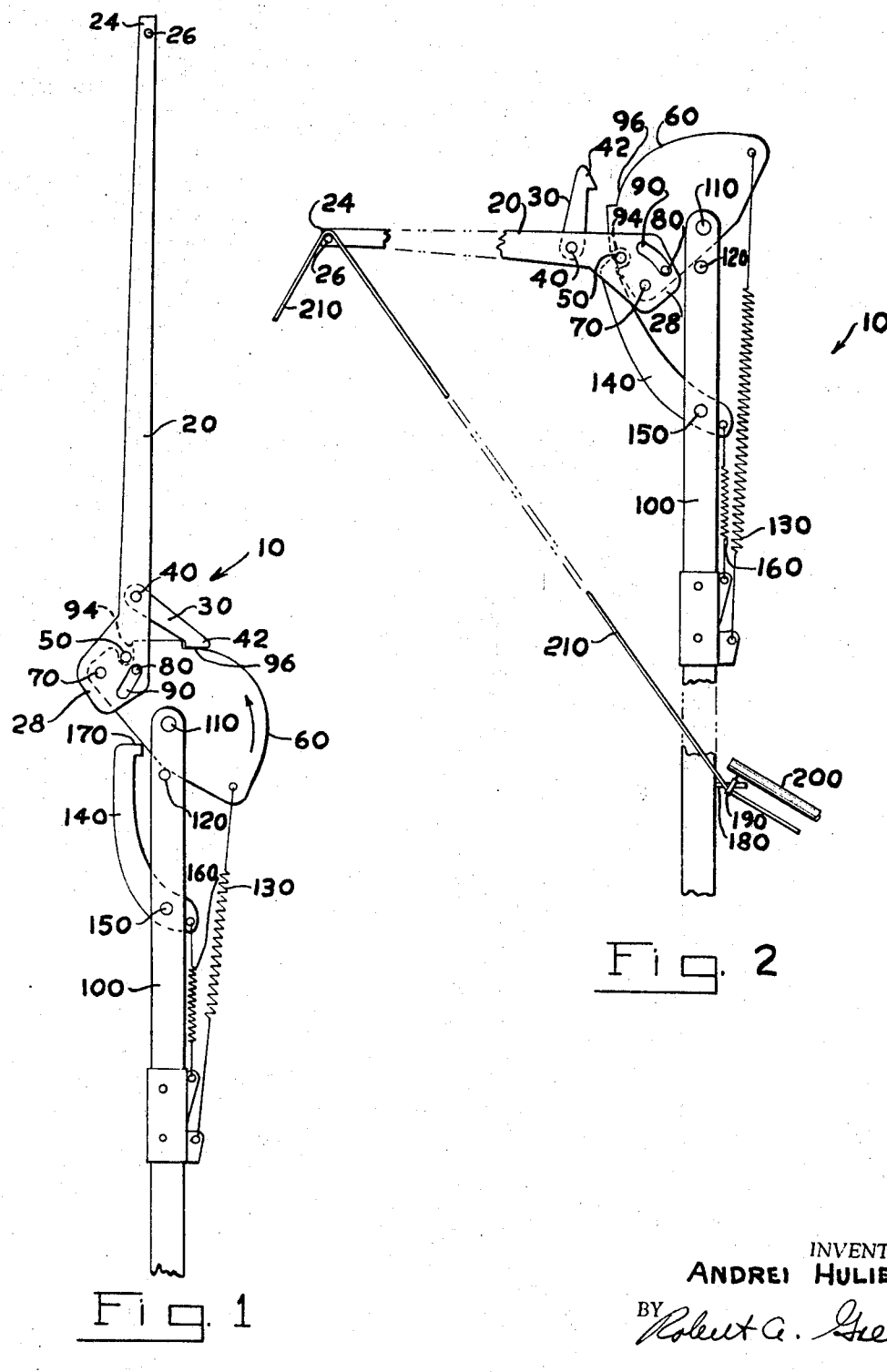

3,451,155
FISHING LINE CONTROL APPARATUS
Andrei Huliew, 39 Johnny Bush Ave.,
Somerset, N.J. 08873
Filed Oct. 27, 1967, Ser. No. 678,615
Int. Cl. A01k 91/00
U.S. Cl. 43—15                                              7 Claims

ABSTRACT OF THE DISCLOSURE

An apparatus for snapping a fishing line toward a fisherman when a fish takes the line comprising an elongated arm for supporting the fishing line, the arm being pivotally coupled to a plate and a ground rod to be supported in the ground while waiting for a fish to bite. The elongated arm carries a pin which is adapted to be set into a cocked position with respect to the plate and a locking arm coupled to the ground rod. Pulling on the line by a fish moves the elongated arm and its pin against the locking arm which is disengaged thereby, and the elongated arm and fishing line are caused to snap back due to the pulling action of a strong spring coupled between the ground rod and the plate.

Background of the invention

Many attempts have been made to provide a simple, efficient and easy-to-use apparatus for holding a fishing rod and line and for snapping the line when a fish bites. The present invention provides such apparatus.

Description of the drawing

In the drawing:
FIG. 1 is an elevational view of the invention before it is set for use; and
FIG. 2 shows the apparatus of FIG. 1 as it appears when cocked and in use and waiting for a fish to bite.

Description of the preferred embodiment

The apparatus of the invention 10 includes a relatively elongated arm 20 which comprises two identical plates secured together and having at one end 24 a small wheel 26 which is adapted to support a fishing line. Arm 20 enlarges gradually from end 24 to end 28 which comprises a relatively large rectangular area so that it can carry various elements. A relatively short locking arm 30 is pivotally secured to arm 20 by pin 40 and is preferably positioned between the two plates thereof. Locking arm 30 includes a locking lip 42 at its outer end.

The other end 28 of the arm 20 carries a fixed pin 50 at about the center of this portion of the arm. The end 28 of arm 20 is also pivotally secured to a plate 60 by means of a pin 70. Plate 60 is also preferably positioned between the two plates of arm 20. The plate 60 carries a fixed pin 80 which rides in an arcuate slot 90 in arm 20. Plate 60 also includes in its periphery an indentation 94 which receives pin 50, and another indentation 96 which is adapted to engage the locking lip 42 of locking arm 30. Plate 60 is also pivotally secured to ground rod 100 by pin 110, and rod 100 carries a fixed pin 120 against which the periphery of plate 60 is adapted to bear to limit its rotation. A strong spring 130 is secured between plate 60 and a suitable remote portion of rod 100.

An arm 140 is pivotally secured to rod 100 by means of pin 150 and includes a locking lip 170 at one end which is adapted to engage the depression or notch 94 in plate 60. The other end of arm 140, which is on the other side of pivot pin 150, is connected by a spring 160 to ground rod 100. Spring 160 tends to urge arm 140 in a clockwise direction, as seen in FIG. 1.

Ground rod 100 includes a pin 180 which is adapted to receive a support ring 190 at the end of a fishing rod 200 to thereby support the fishing rod, and the fishing line 210 is extended from the rod over ring or wheel 26 as it extends out into the water.

In operation of the apparatus of the invention 10, first the fishing line is cast into the water. Next, apparatus 10 is cocked. For this, arm 30 is rotated so that its locking lip 42 engages notch 96 in plate 60, and the arm 20 is rotated in a counter-clockwise direction about pin 70 to rotate plate 60 counter-clockwise until lip 170 on arm 140 can engage the notch 94 in plate 60. In this position of the parts, the lip 170 is in contact with pin 50 carried by arm 20. Arm 30 is manually released from its engagement with plate 60, and the apparatus is thus cocked and ready for use. In this cocked position, the apparatus is placed in the ground vertically by way of rod 100, with or without an auxilary extension rod and with the fishing pole 200 in place supported on pin 180 and with the fishing line 210 extending from the pole over the wheel 26 and out into the water. When a fish takes the line, it exerts a counter-clockwise pull on arm 20 which causes pin 50 to push lip 170 of arm 140 out of notch 94 in plate 60. With plate 60 thus freed, spring 130 rotates plate 60 strongly in a clockwise direction, and plate 60, acting through pin 80, carries arm 20 with it in a clockwise direction, and thereby a strong force is applied to the fishing line, tending to pull a fish toward shore.

What is claimed is:
1. Fishing line control apparatus comprising
    a ground support rod,
    a plate pivotally secured to said ground rod,
    an elongated arm pivotally secured to said plate,
    said rod, said plate, and said arm each having separate means which are adapted to be interlocked to place said apparatus in a cocked state and under spring tension,
    said separate means comprising an indentation in the periphery of said plate, a pin carried by said elongated arm and adapted to be positioned in said indentation, and an arm pivotally secured to said ground rod and having one end adapted to engage said indentation,
    movement of said elongated arm and said pin carried thereby being adapted to push said arm out of engagement with said indentation, and
    means on said elongated arm for supporting a fishing line, movement of said elongated arm and said fishing line when caught by a fish causing all of said separate means to become unlocked whereby said elongated arm jerks the fishing line and warns the fisherman.
2. The apparatus defined in claim 1 and including a spring connected between said plate and said rod, said spring being put in tension when said separate means are interlocked and cocked.
3. The apparatus defined in claim 2 wherein said plate and said elongated arm include auxiliary interlocking means to cause said plate and said arm to move as a unit when the apparatus becomes uncocked.
4. The apparatus defined in claim 3 wherein said auxiliary means comprises a pin carried by said plate which rides in a slot in said elongated arm.
5. The apparatus defined in claim 1 wherein said ground rod carries a pin for supporting a fishing rod and said elongated arm includes means for guiding the fishing line from said fishing rod out into the water.
6. Fishing line control apparatus comprising
    a first rod adapted to be secured vertically in the ground and adapted to have a fishing rod coupled thereto,
    a plate pivotally coupled to said first rod and adapted to pivot clockwise and counter-clockwise with respect to said first rod, a spring connected between said plate and said rod and urging said plate in a clockwise direction,
an elongated arm pivotally secured to said plate,
a guide at one end of said elongated arm for guiding a fishing line,
a pin carried by said elongated arm and adapted to be positioned in an indentation in the periphery of said plate by pivoting said elongated arm and said plate with respect to each other,
a first arm pivotally secured to said rod and having an end adapted to be positioned in said indentation in contact with said pin, the other end of said first arm being coupled by a spring to said first rod,
a second arm pivotally secured to said elongated arm and adapted to engage said plate to permit the apparatus to be cocked by rotating said plate and elongated arm counter-clockwise as a unit.

7. Fishing line control apparatus comprising
a first ground rod adapted to be secured vertically in the ground,
a first pin on said first rod for supporting a fishing rod,
a plate pivotally coupled to said first rod and adapted to pivot clockwise and counter-clockwise with respect to said first rod about a pivot pin,
a stop pin on said first rod adapted to limit the rotation of said plate in one direction,
a first spring connected between said plate and said rod and urging said plate in said one direction,
an elongated arm pivotally secured to said plate on the other side of said pivot point remote from said first spring,
a guide wheel at one end of said elongated arm for guiding a fishing line from said fishing rod out into the water,
a second pin carried by said elongated arm and adapted to be positioned in an indentation in the periphery of said plate by pivoting said elongated arm and said plate with respect to each other,
a cocking arm pivotally secured to said first rod remote from said plate and having a hook-like end portion adapted to be positioned in said indentation in contact with said second pin, the other end of said cocking arm being coupled by a spring to said first rod,
a second arm pivotally secured to said elongated arm and adapted to engage a second indentation in said plate to permit the apparatus to be cocked by rotating said plate and elongated arm in the direction opposite to said one direction as a unit.

References Cited
UNITED STATES PATENTS

| | | | |
|---|---|---|---|
| 2,781,600 | 2/1957 | McDonnell | 43—15 |
| 2,964,868 | 12/1960 | Bennett | 43—15 |
| 2,996,824 | 8/1961 | Faycosh | 43—16 |
| 3,154,875 | 11/1964 | Biddison | 43—15 |

ALDRICH F. MEDBERY, *Primary Examiner.*

DANIEL J. LEACH, *Assistant Examiner.*